March 5, 1946.　　　A. H. TINNERMAN　　　2,396,062
FASTENING DEVICE
Filed April 7, 1943

INVENTOR.
ALBERT H. TINNERMAN
BY Bates, Teare & McDean
ATTORNEYS

Patented Mar. 5, 1946

2,396,062

UNITED STATES PATENT OFFICE 2,396,062

FASTENING DEVICE

Albert H. Tinnerman, Cleveland, Ohio, assignor to Tinnerman Products, Inc., Cleveland, Ohio, a corporation of Ohio Application April 7, 1943, Serial No. 482,213

4 Claims. (Cl. 174—40)

This invention relates to a clamping device for embracing and supporting a conduit or other object. One of the purposes of the invention is to provide in as simple a manner as possible a cushioned clamp adapted to embrace the object and provided with means for attaching it to a support and at the same time provide an electrical path from the object to the support, so that it is grounded to avoid a static charge accumulating on the object.

My clamping device is of the type which provides a metallic loop carrying a cushioned lining so that it may embrace a conduit or other object of a generally cylindrical form with an effective clamping action notwithstanding variations in the size of the object. The cushioning lining being of rubber or similar material is naturally of insulating character. To enable the use of such lining and also to electrically ground the object, I form on the clamping strap a tongue which projects inwardly through the lining and extends arcuately along the interior thereof so that it may lie snugly against the object and make a good contact therewith. In this manner, I am able to provide a continuously cushioned clamp for effectively holding the object and at the same time I form an electric connection between the object and the clamp, and thence to the support for the clamp. This provision of means on the clamp itself extending through the lining to metallically engage the object is a feature of my invention as hereinafter more fully explained.

Figure 1:
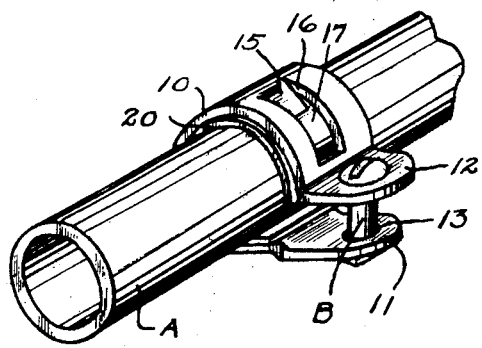
Figure 2:
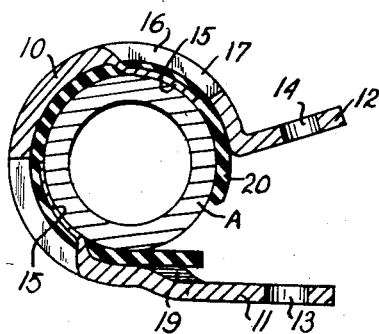
Figure 3:
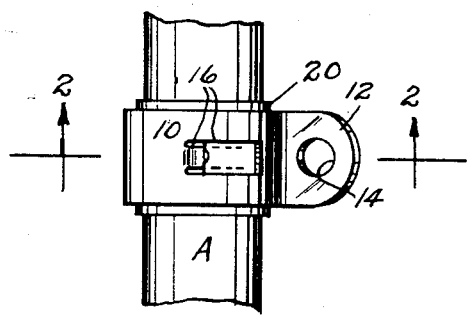

In the drawing, Fig. 1 is a perspective view of my conduit clamp in place on a conduit, a suitable supporting arm being indicated by way of example in broken lines; Fig. 2 is a central section through the clamp and conduit, as indicated by the line 2—2 on Fig. 3 but on a larger scale; Fig. 3 is a plan of the clamp on the conduit without the attaching bolt.

As shown in each of the figures, A indicates a cylindrical tubular member which may be a conduit for oil or other material. It is also to be taken as an illustration of any other similarly shaped object, as a solid bar or a bundle of wires grouped into a substantially cylindrical form.

10 designates the metallic member of my cushioning clamp. This member comprises a single strip of spring sheet metal bent into a circular form for approximately three-fourths of a circumference and terminating in two arms, one of which, 11, is shown as extending substantially tangentially to the curved portion, while the other of which, 12, extends abruptly from such curved portion approximately at right angles to a tangent thereto. The tangential arm 11 is shown as slightly offset and braced by an indented portion 19 to stiffen that arm.

The two arms 11 and 12 are provided with openings 13 and 14 for the passage of a securing bolt as shown at B, Fig. 1, which is adapted to attach the clamp to a suitable support. The support may extend between the arms to be engaged thereby on opposite sides when the arms come into the position shown in Fig. 1, or, in case of a relatively smaller conduit or larger clamp than shown, the arm 12 may come down into contact with the arm 11 and the support stand beneath the latter arm.

20 indicates an arcuate lining of rubber or similar yielding material on the inner face of the curved portion of the strap and extending at each end beyond the curved portion, as shown in Fig. 2. To provide for an electric connection between the metal clamp and the embracing conduit notwithstanding this insulating lining, I form one or more inwardly diverted arcuate tongues out of the material of the strap and passing through the lining and extending along its inner surface. Fig. 2 shows two of these arcuate tongues, designated 15. Each tongue is made by providing a U-shaped or three-sided slit 16 through the strap, thus leaving the tongue anchored at its end to the strap and then deflecting it inwardly of the opening 17 provided by the slits 16. Preferably the tongue is reduced in thickness by cutting or swaging.

The inwardly bent arcuate tongues pass through openings in the lining and then extend along the inner face thereof between the lining and conduit as shown in Fig. 2. In this manner the tongues make an electric connection from the exterior of the conduit to the body of the clamp. These tongues also provide the means for retaining the lining in place in the loop. As shown in Fig. 3, there is sufficient clearance between the side edges of the tongue and the walls of the slot to permit the lining to pass freely over the tongue and bend up slightly into the slot, so that the lining is firmly anchored to the clamp.

It will be seen that my self-bonding clamp is extremely simple in construction, comprising merely two parts, namely, the metal strap and the insulating lining, the integral tongues by puncturing the strap serving the double purpose of forming the ground connection and retaining the lining in place. In use the tongues do not interfere with the yielding character of the lining, which enables the clamp to grasp the conduit effectively without danger of injuring it.

I claim:

1. A fastening device comprising a loop of spring sheet metal terminating in attaching arms, each having an opening through it, a tongue formed integrally from the body of the loop by a substantially U-shaped slit therein, the tongue being reduced in thickness and diverted inwardly from the body of the loop, and a yielding lining on the interior of the loop, said tongue passing through the lining and extending in an arcuate direction along the inner surface thereof to hold the lining against the loop and provide a grounding connection to the clamp.

2. A fastening device comprising a metallic clamping member and a yielding lining on the interior thereof, said clamping member comprising a curved loop terminating at each end in an outwardly projecting attaching arm, said lining being a continuous strip extending from beyond the region of one arm about the interior of the loop to a point beyond the region of the other arm, there being one or more U-shaped slits through the body of the metal loop, each providing a tongue attached at one end to such body, said tongue being reduced in thickness from that of the body of the loop and bent inwardly adjacent its region of attachment and there passing through the lining strip and then continuing in an arcuate direction and lying snugly against the interior of the lining beneath the opening in the loop from which the tongue was struck.

3. A fastening device comprising a loop terminating in a pair of projecting arms, each having an opening through it for the passage of a bolt or screw, a tongue struck from the body of the loop and diverted inwardly therefrom, and an insulating lining of yielding material on the interior of the loop, said tongue having a free end and passing through the lining and extending along the interior of the lining and embedded therein to contact with an object embraced by the lining.

4. A fastening device of the character described comprising a loop with a lining and an integral tongue formed of the material of the loop and having a free end, said tongue passing through the lining and curving in parallelism with the inner face thereof to contact with the member embraced, said curved portion of the tongue underlying the lining and serving to hold the lining in place before the clamp is applied.

ALBERT H. TINNERMAN.